US012798000B2

(12) United States Patent
Choi

(10) Patent No.: US 12,798,000 B2
(45) Date of Patent: Nov. 17, 2026

(54) LASER DEVICE

(71) Applicant: Samsung Display Co., LTD., Yongin-si (KR)

(72) Inventor: Kyongsik Choi, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1013 days.

(21) Appl. No.: 17/832,092

(22) Filed: Jun. 3, 2022

(65) Prior Publication Data

US 2023/0112064 A1 Apr. 13, 2023

(30) Foreign Application Priority Data

Oct. 13, 2021 (KR) ........................ 10-2021-0135614

(51) Int. Cl.
*B23K 26/064* (2014.01)
*B23K 26/046* (2014.01)
*G02B 6/42* (2006.01)
*G02B 27/09* (2006.01)

(52) U.S. Cl.
CPC ........ *B23K 26/0648* (2013.01); *B23K 26/046* (2013.01); *G02B 6/4206* (2013.01); *G02B 27/0961* (2013.01)

(58) Field of Classification Search
CPC .............. B23K 26/0648; B23K 26/046; B23K 26/0006; B23K 26/0665; B23K 26/352; B23K 2101/40; B23K 2103/56; G02B 27/0927; G02B 27/10; G02B 27/0961; G02B 3/08; G02B 3/02; H01S 5/02253; H01S 5/02255
See application file for complete search history.

(56) References Cited

U.S. PATENT DOCUMENTS

2007/0182931 A1 8/2007 Ushiro et al.
2010/0014063 A1* 1/2010 Sumi .................. G02B 26/0833 359/290
2014/0293264 A1 10/2014 Miyazaki et al.
2022/0244434 A1* 8/2022 Lippman ................ G02B 1/041

FOREIGN PATENT DOCUMENTS

DE 10225674 A1 * 12/2003 ......... G02B 27/0961
JP 11-170079 6/1999
JP 2000-206449 A 7/2000
JP 2004-95792 3/2004
JP 2004095792 A * 3/2004
JP 2014-209078 A 11/2014
(Continued)

OTHER PUBLICATIONS

Yamazaki_English2 (Year: 2004).*
(Continued)

*Primary Examiner* — Minsun O Harvey
*Assistant Examiner* — Alexander Ehrlich
(74) *Attorney, Agent, or Firm* — Womble Bond Dickinson (US) LLP

(57) ABSTRACT

A laser device may include a first lens array including first lenses arranged in a first direction, a condenser lens disposed in a second direction intersecting the first direction of the first lens array and a first refractive index adjusting member disposed in a third direction opposite to the second direction of the first lens array.

19 Claims, 12 Drawing Sheets

(56) References Cited

FOREIGN PATENT DOCUMENTS

| | | | |
|---|---|---|---|
| JP | 2015-57765 | | 3/2015 |
| KR | 10-2006-0132636 | A | 12/2006 |
| KR | 10-2007-0090246 | | 9/2007 |

OTHER PUBLICATIONS

Brunwinkel_English (Year: 2003).*
Korean Office action issued in corresponding KR application No. 10-2021-0135614, dated Mar. 4, 2026, with English translation, 13 pages.

* cited by examiner

LASER DEVICE

CROSS-REFERENCE TO RELATED APPLICATION(S)

This application claims priority and benefits of Korean Patent Application No. 10-2021-0135614 under 35 U.S.C. § 119, filed in the Korean Intellectual Property Office on Oct. 13, 2021, the entire contents of which are incorporated herein by reference.

BACKGROUND

1. Technical Field

Embodiments relate to a laser device capable of generating a homogeneous laser beam.

2. Description of the Related Art

A display device may include driving elements and light emitting elements. The light emitting element may receive a signal from the driving elements to emit light. Multiple driving elements may be disposed to precisely drive the light emitting elements. For example, each of transistors may transmit a signal in response to a gate signal. The transistors may be different from each other, and the transistors may be used together to precisely drive light emitting elements.

A semiconductor element included in each of the plurality of transistors is important in precisely transmitting a signal by the transistors. The semiconductor element may include an oxide semiconductor material or a silicon semiconductor material. The silicon semiconductor material may include amorphous silicon, polycrystalline silicon, or the like. The polycrystalline silicon may be obtained by crystallizing amorphous silicon. A homogeneous laser beam should be used for crystallization of the polycrystalline silicon.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments may provide a laser device capable of generating a homogeneous laser beam.

However, embodiments of the disclosure are not limited to those set forth herein. The above and other embodiments will become more apparent to one of ordinary skill in the art to which the disclosure pertains by referencing the detailed description of the disclosure given below.

An embodiment of a laser device may include a first lens array including first lenses arranged in a first direction, a condenser lens disposed in a second direction intersecting the first direction of the first lens array, and a first refractive index adjusting member disposed in a third direction opposite to the second direction of the first lens array.

In an embodiment, part of the first lenses may have different radii of curvature from other part of the first lenses, and a focal lengths of the other part of the first lenses may be about −30% to about +30% compared to focal lengths of the part of the first lenses.

In an embodiment, the laser device may further include a polarizing member disposed in the third direction of the first lens array.

In an embodiment, part of the first lenses may be disposed at different positions in the second direction from other part of the first lenses, and a position at which a focus of the other part of the first lenses is formed may be about −30% to about +30% compared to a position at which a focus of the part of the first lenses is formed.

In an embodiment, the laser device may further include a polarizing member disposed in the third direction of the first lens array.

In an embodiment, the laser device may further include a polarizing member disposed in the third direction of the first lens array.

In an embodiment, the polarizing member may be disposed between the first lens array and the first refractive index adjusting member.

In an embodiment, the first refractive index adjusting member may be disposed between the polarizing member and the first lens array.

In an embodiment, the polarizing member may be disposed only in the third direction of on part of the first lenses.

In an embodiment, the first refractive index adjusting member may extend from a bottom portion to a top portion in the first direction, and a refractive index of the first refractive index adjusting member changes from the bottom portion to the top portion.

In an embodiment, the refractive index of the first refractive index adjusting member may change linearly from the bottom portion to the top portion.

In an embodiment, the refractive index of the first refractive index adjusting member may change non-linearly from the bottom portion to the top portion.

In an embodiment, the refractive index of the first refractive index adjusting member may be symmetrical with respect to a center of the first refractive index adjusting member.

In an embodiment, the laser device may further include a second lens array disposed between the first lens array and the condenser lens and including a plurality of second lenses.

In an embodiment, the laser device may further include a second refractive index adjusting member disposed in the third direction of the second lens array.

In an embodiment, the laser device may further include a polarizing member disposed in the third direction of the second lens array.

In an embodiment, the polarizing member may be disposed between the second lens array and the second refractive index adjusting member.

In an embodiment, the second refractive index adjusting member may be disposed between the polarizing member and the second lens array.

In an embodiment, the polarizing member may be disposed only in the third direction of part of the of second lenses.

An embodiment of a laser device may include a first lens array including a plurality of first lenses arranged in a first direction, a condenser lens disposed in a second direction intersecting the first direction of the first lens array and a first refractive index adjusting member disposed in a third direction opposite to the second direction of the first lens array. Accordingly, the refractive index adjusting member may improve homogeneity of the laser beam incident to the lens array, and the laser device may generate a homogeneous laser beam.

The laser device may further include a polarizing member disposed in the third direction of the lens array, and accordingly, the polarizing member may improve polarization characteristics of a laser beam incident to the lens array.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
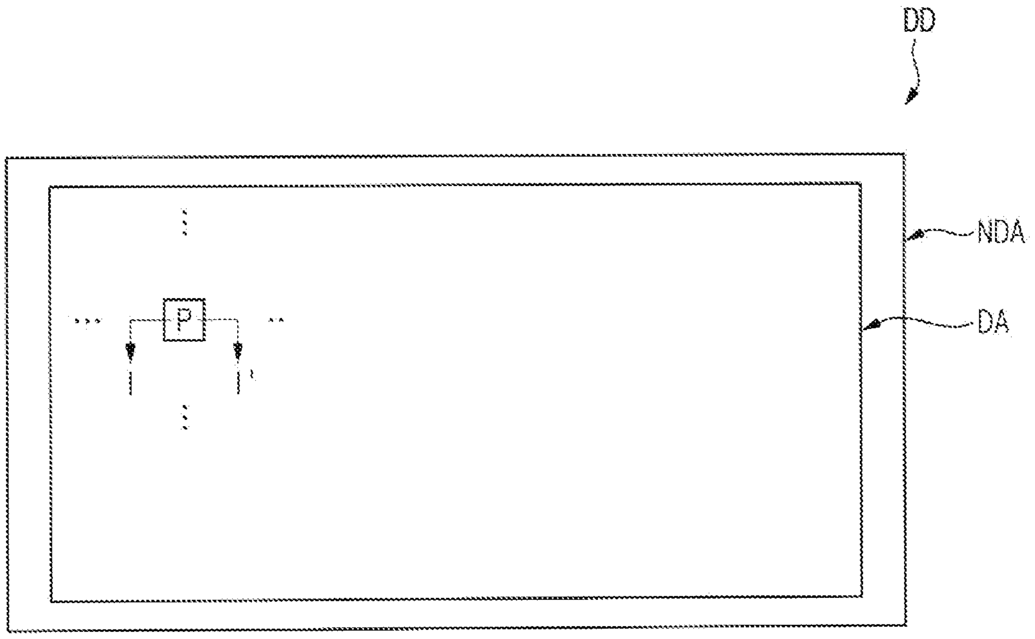
FIG. 1 is a schematic plan view illustrating a display device according to an embodiment.

The disclosure now will be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will convey the scope of the disclosure to those skilled in the art. Like reference numerals refer to like elements throughout.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic plan view illustrating a display device according to an embodiment.

Referring to FIG. 1, the display device DD may include a display area DA and a non-display area NDA. The non-display area NDA may surround the display area DA. However, the non-display area NDA may be disposed only on at least one side of the display area DA.

Pixels P may be disposed in the display area DA. The pixels P may include a driving element (e.g., a transistor, etc.) and a light emitting element (e.g., an organic light emitting diode, etc.) electrically connected to the driving element. The light emitting element may receive a signal from the driving element to emit light. Thus, the display device DD may display an image by the light emitted from the pixels P. To this end, the plurality of pixels P may be generally disposed in the display area DA. For example, the pixels P may be arranged in a matrix form in the display area DA.

Drivers for driving the pixels P may be disposed in the non-display area NDA. The drivers may include a data driver, a gate driver, a light emitting driver, a power voltage generator, a timing controller, and the like. The pixels P may emit the light based on signals received from the drivers.

Figure 2:
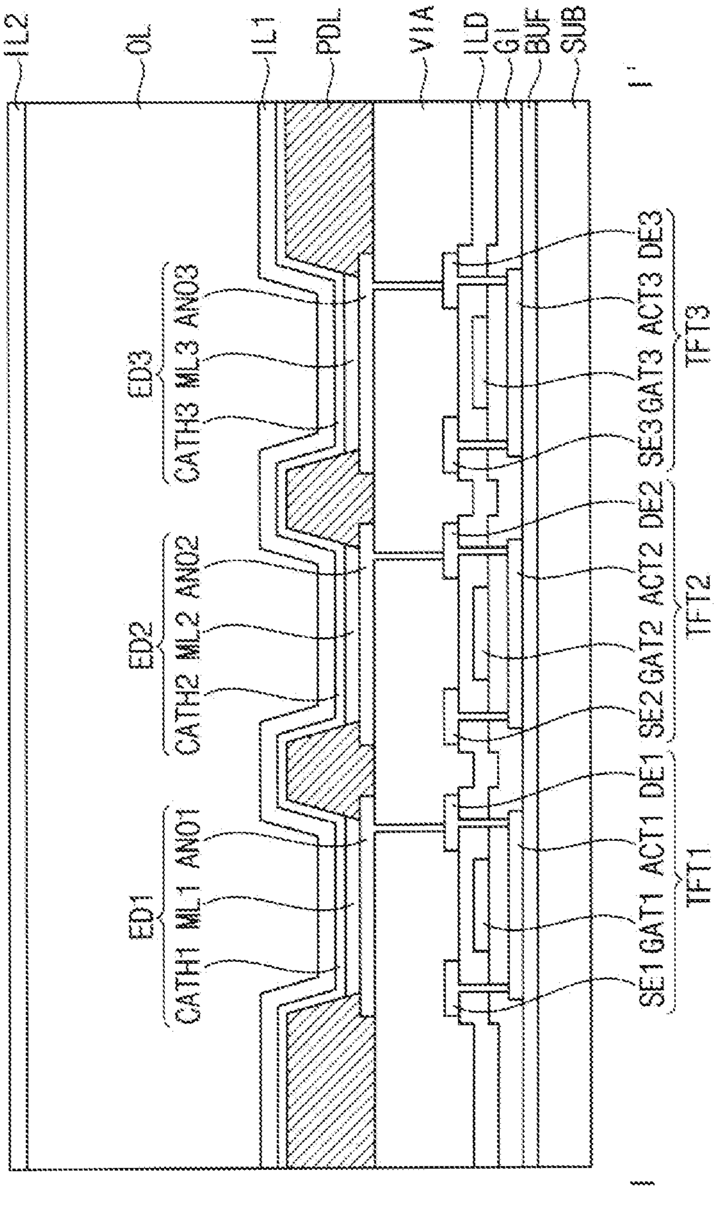
FIG. 2 is a schematic cross-sectional view illustrating an embodiment taken along line I-I' of FIG. 1.

FIG. 2 is a schematic cross-sectional view illustrating an embodiment taken along line I-I' of FIG. 1.

Referring to FIGS. 1 and 2, the display device DD may include a substrate SUB, a buffer layer BUF, a gate insulating layer GI, a first transistor TFT1, a second transistor TFT2, a third transistor TFT3, an interlayer insulating layer ILD, a via insulating layer VIA, a first light emitting element ED1, a second light emitting element ED2, a third light emitting element ED3, a pixel defining layer PDL, and a thin film encapsulation layer.

The first transistor TFT1 may include a first active layer ACT1, a first gate electrode GAT1, a first source electrode SE1, and a first drain electrode DE1. The second transistor TFT2 may include a second active layer ACT2, a second gate electrode GAT2, a second source electrode SE2, and a second drain electrode DE2. The third transistor TFT3 may include a third active layer ACT3, a third gate electrode GAT3, a third source electrode SE3, and a third drain electrode DE3.

The first light emitting element ED1 may include a first anode electrode ANO1, a first intermediate layer ML1, and a first cathode electrode CATH1. The second light emitting element ED2 may include a second anode electrode ANO2, a second intermediate layer ML2, and a second cathode electrode CATH2. The third light emitting element ED3 may include a third anode electrode ANO3, a third intermediate layer ML3, and a third cathode electrode CATH3. In this case, the first to third cathode electrodes CATH1, CATH2, CATH3 may be integrally formed (or integral with each other).

The thin film encapsulation layer may include a first inorganic layer ILL an organic layer OL, and a second inorganic layer IL2. Although the thin film encapsulation layer of FIG. 2 is composed of the three layers IL1, OL, and IL2, the thin film encapsulation layer may further include separate (or additional) inorganic layers and organic layers.

The substrate SUB may include a flexible material or a rigid material. For example, the substrate SUB may include a polymer material such as polyimide, and in this case, the substrate SUB may have a flexible characteristic. As another example, for example, the substrate SUB may include a material such as glass, and in this case, the substrate SUB may have a rigid characteristic.

The buffer layer BUF may be disposed on the substrate SUB. The buffer layer BUF may include an inorganic insulating material. Examples of the material that can be used as the buffer layer BUF include silicon oxide ($SiO_x$), silicon nitride ($SiN_x$), silicon oxynitride ("SiON"), and the like. These may be used alone or in combination with each other. However, the disclosure is not limited thereto, and other insulating materials may be used as the buffer layer BUF. The buffer layer BUF may prevent metal atoms or impurities from diffusing into the first to third active layers ACT1, ACT2, and ACT3. The buffer layer BUF may control the speed of heat (e.g., heat radiation or heat transmission) provided to the first to third active layers ACT1, ACT2, and ACT3 during a crystallization process for forming the first to third active layers ACT1, ACT2, and ACT3.

The first to third active layers ACT1, ACT2, and ACT3 may be disposed on the buffer layer BUF. In some embodiments, the first to third active layers ACT1, ACT2, and ACT3 may include a silicon semiconductor. Examples of materials that can be used as the first to third active layers ACT1, ACT2, and ACT3 may include amorphous silicon and polycrystalline silicon. As another example, in some embodiments, the first to third active layers ACT1, ACT2, and ACT3 may include an oxide semiconductor. Examples of materials that can be used as the first to third active layers ACT1, ACT2, and ACT3 may include at least one of indium-gallium-zinc oxide (IGZO), indium-gallium oxide (IGO), and indium-zinc oxide (IZO), and the like.

In some embodiments, the silicon semiconductor may be crystallized by irradiating a laser to amorphous silicon. In case that a laser is irradiated to the amorphous silicon, the amorphous silicon may be crystallized into polycrystalline silicon. In this case, the performance (e.g., electrical characteristics) of the first to third transistors TFT1, TFT2, and TFT3 may be improved according to a degree of crystallization of the silicon semiconductor. For example, in response to the gate signal provided to the first to third gate electrodes GAT1, GAT2, GAT3, the signal and/or voltage may effectively flow through the first to third transistors TFT1, TFT2, TFT3.

The gate insulating layer GI may be disposed on the buffer layer BUF. The gate insulating layer GI may cover (or overlap, e.g., in a plan view) the first to third active layers ACT1, ACT2, and ACT3. The gate insulating layer GI may include an insulating material. Examples of the material that can be used as the gate insulating layer GI may include at least one of silicon oxide ($SiO_x$), silicon nitride ($SiN_x$), silicon oxynitride (SiON), and the like. These may be used alone or in combination with each other. However, the disclosure is not limited thereto, and other insulating materials may be used as the gate insulating layer GI.

The first to third gate electrodes GAT1, GAT2, and GAT3 may be disposed on the gate insulating layer GI. The first to third gate electrodes GAT1, GAT2, and GAT3 may overlap (e.g., partially overlap) the first to third active layers ACT1, ACT2, and ACT3, e.g., in a plan view. The signal and/or the voltage may flow through the first to third active layers ACT1, ACT2, and ACT3 in response to the gate signal provided to the first to third gate electrodes GAT1, GAT2, and GAT3. In an embodiment, the first to third gate electrodes GAT1, GAT2, and GAT3 may include a metal, an alloy, a metal oxide, a transparent conductive material, or the like. Examples of materials that can be used as the first to third gate electrodes GAT1, GAT2, and GAT3 may include at least one of silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO) and the like. These may be used alone or in combination with each other. However, the disclosure is not limited thereto, and other conductive materials may be variously used as the first to third gate electrodes GAT1, GAT2, and GAT3.

The interlayer insulating layer ILD may be disposed on the gate insulating layer GI. The interlayer insulating layer ILD may cover the first to third gate electrodes GAT1, GAT2, and GAT3. In an embodiment, the interlayer insulating layer ILD may include an insulating material. Examples of the material that can be used as the interlayer insulating layer ILD include at least one of silicon oxide ($SiO_x$), silicon nitride ($SiN_x$), silicon oxynitride (SiON), and the like. These may be used alone or in combination with each other. However, the disclosure is not limited thereto, and other insulating materials may be used as the interlayer insulating layer ILD.

The first to third source electrodes SE1, SE2, and SE3 and the first to third drain electrodes DE1, DE2, and DE3 may be disposed on the interlayer insulating layer ILD. The first source electrode SE1 and the first drain electrode DE1 may contact (or be electrically connected to) the first active layer ACT1 through contact holes formed through the gate insulating layer GI and the interlayer insulating layer ILD, respectively. The second source electrode SE2 and the second drain electrode DE2 may contact (or be electrically connected to) the second active layer ACT2 through contact holes formed through the gate insulating layer GI and the interlayer insulating layer ILD, respectively. The third source electrode SE3 and the third drain electrode DE3 may contact (or be electrically connected to) the third active layer ACT3 through contact holes formed through the gate insulating layer GI and the interlayer insulating layer ILD, respectively. In an embodiment, each of first to third source electrodes SE1, SE2, and SE3 and the first to third drain electrodes DE1, DE2, and DE3 may include a metal, an alloy, a metal oxide, a transparent conductive material, or the like. The transparent conductive material of the first to third source electrodes SE1, SE2, and SE3 and the first to third drain electrodes DE1, DE2, and DE3 may include at least one of silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO) and the like. These may be used alone or in combination with each other. However, the disclosure is not limited thereto, and other conductive materials may be variously used as the first to third source electrodes SE1, SE2, and SE3 and the first to third drain electrodes DE1, DE2, and DE3.

The via insulating layer VIA may be disposed on the interlayer insulating layer ILD. The via insulating layer VIA may cover the first to third source electrodes SE1, SE2, and SE3 and the first to third drain electrodes DE1, DE2, and DE3. The via insulating layer VIA may have a substantially flat top surface. In an embodiment, the via insulating layer VIA may include an organic insulating material. Examples of the material that can be used as the via insulating layer VIA may include at least one of photoresist, polyacrylic resin, polyimide resin, acrylic resin, and the like. These may be used alone or in combination with each other. However, the disclosure is not limited thereto, and other insulating materials may be used as the via insulating layer VIA.

The first to third anode electrodes ANO1, ANO2, and ANO3 may be disposed on the via insulating layer VIA. The first to third anode electrodes ANO1, ANO2, and ANO3 may contact the first to third drain electrodes DE1, DE2, and DE3. For example, the first to third anode electrodes ANO1, ANO2, and ANO3 may be electrically connected to the first to third drain electrodes DE1, DE2, and DE3 through contact holes formed through the via insulating layer VIA. In an embodiment, each of the first to third anode electrodes ANO1, ANO2, and ANO3 may include various materials such as a metal, an alloy, a metal oxide, a transparent conductive material, or the like. Examples of materials that can be used as the first to third anode electrodes ANO1, ANO2, and ANO3 may include at least one of silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO) and the like. These may be used alone or in combination with each other. However, the disclosure is not limited thereto, and other conductive materials may be variously used as the first to third anode electrodes ANO1, ANO2, and ANO3.

The pixel defining layer PDL may be disposed on the via insulating layer VIA. Openings exposing the first to third anode electrodes ANO1, ANO2, and ANO3 may be formed in the pixel defining layer PDL. In an embodiment, the pixel defining layer PDL may include an organic material. Examples of materials that can be used as the pixel defining layer PDL may include at least one of photoresists, polyacrylic resins, polyimide resins, and acrylic resins. However, the disclosure is not limited thereto, and other insulating materials may be used as the pixel defining layer PDL.

The first to third intermediate layers ML1, ML2, and ML3 may be respectively disposed on the first to third anode electrodes ANO1, ANO2, and ANO3. The first to third intermediate layers ML1, ML2, and ML3 may include an organic material emitting light of a color. The first to third intermediate layers ML1, ML2, and ML3 may emit light based on a potential difference between the first to third anode electrodes ANO1, ANO2, and ANO3 and the first to third cathode electrodes CATH1, CATH2, and CATH3. To this end, the first to third intermediate layers ML1, ML2, and ML3 may include an electron injection layer, an electron transport layer, a light emitting layer, a hole transport layer, and a hole injection layer. For example, each of the first to third intermediate layers ML1, ML2, and ML3 may include at least one of the electron injection layer, the electron transport layer, the light emitting layer, the hole transport layer, and the hole injection layer.

The first to third light emitting elements ED1, ED2, and ED3 may emit light having a same color as each other. For example, all of the first to third light emitting elements ED1, ED2, and ED3 may emit blue light. As another example, the first to third light emitting elements ED1, ED2, and ED3 may emit light of different colors. For example, the first to third light emitting elements ED1, ED2, and ED3 may respectively emit red light, green light, and blue light.

The first to third cathode electrodes CATH1, CATH2, and CATH3 may be disposed on the first to third intermediate layers ML1, ML2, and ML3. The first to third cathode electrodes CATH1, CATH2, and CATH3 may include various materials such as a metal, an alloy, a metal oxide, a transparent conductive material, or the like. Examples of materials that can be used as the first to third cathode electrodes CATH1, CATH2, and CATH3 may include at least one of silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO) and the like. These may be used alone or in combination with each other. However, the disclosure is not limited thereto, and other conductive materials may be variously used as the first to third cathode electrodes CATH1, CATH2, and CATH3. For convenience of description, the cathode electrode CATH1, CATH2, and CATH3 of FIG. 2 are divided into the first to third cathode electrodes CATH1, CATH2, and CATH3, but the first to third cathode electrodes CATH1, CATH2, and CATH3 may be integral with each other.

A thin film encapsulation layer may be disposed on the first to third cathode electrodes CATH1, CATH2, and CATH3. The thin film encapsulation layer may protect the first to third light emitting elements ED1, ED2, and ED3 from external moisture, heat, impact, or the like. The thin film encapsulation layer may have a structure in which a first inorganic layer ILL an organic layer OL, and a second inorganic layer IL2 are stacked one other. For example, the thin film encapsulation layer may include the first inorganic layer ILL the organic layer OL, and the second inorganic layer IL2. The organic layer OL may have a relatively larger thickness than the first and second inorganic layers IL1 and IL2.

Figure 3:
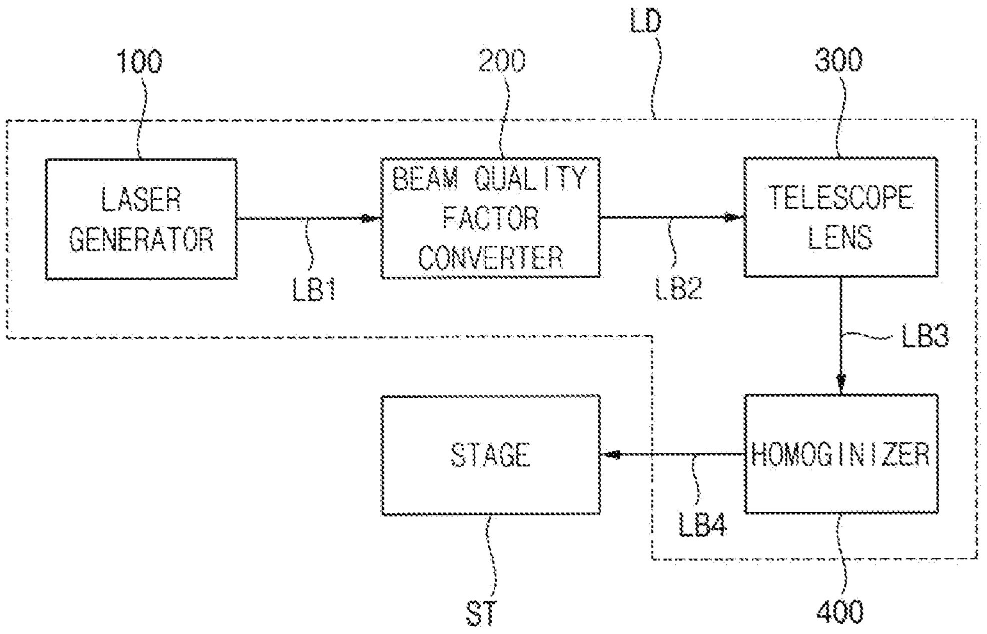
FIG. 3 is a schematic block view illustrating a laser device according to an embodiment of the disclosure.

FIG. 3 is a schematic block view illustrating a laser device according to an embodiment of the disclosure.

Referring to FIG. 3, the laser device LD may include a laser generator 100, a beam quality factor converter 200, a telescope lens 300, and a homogenizer 400. A fourth laser beam LB4 emitted from the laser device LD may be irradiated onto a stage ST.

The laser generator 100 may emit a first laser beam LB1. The laser generator 100 may emit at least one first laser beam LB1. For example, the laser generator 100 may emit one first laser beam LB1 or two or more first laser beams LB1 as needed. The first laser beam LB1 may have straightness. The first laser beam LB1 may form a beam spot on an irradiation surface. The first laser beam LB1 may have a central portion having a Gaussian type energy distribution of high energy.

In embodiments, the laser generator 100 may emit an excimer laser beam, a YAG laser beam, a glass laser beam, a YVO4 laser beam, an Ar laser beam, a ruby laser beam, or the like. However, the disclosure is not limited thereto, and the laser generator 100 may emit various laser beams capable of crystallizing amorphous silicon.

The beam quality factor converter 200 may convert a long axis size and a short axis size of the first laser beam LB1 to output the converted first laser beam LB1. A long axis and a short axis of the first laser beam LB1 may be perpendicular to each other. In embodiments, the beam quality factor converter 200 may change the beam quality factor in a long axis direction and the beam quality factor in a short axis direction of the first laser beam LB1. The beam quality factor converter 200 may improve homogeneity of the first laser beam LB1, and the homogeneous first laser beam LB1 may be generated. The beam quality factor converter 200 may convert the long axis size and the short axis size of the first laser beam LB1 to emit a second laser beam LB2. However, the beam quality factor converter 200 may not be an essential component of the laser device LD. In other embodiments, the beam quality factor converter 200 may be omitted.

In some embodiments, the telescope lens 300 may adjust a size of the second laser beam LB2. For example, the telescope lens 300 may increase or decrease a long axis size of the second laser beam LB2. The telescope lens 300 may include multiple lenses. The telescope lens 300 may adjust the size of the second laser beam LB2 to emit a third laser beam LB3.

In some embodiments, the homogenizer 400 may homogenize the third laser beam LB3. The homogenizer 400 may include a homogenizing lens, a condenser lens, and the like. The homogenizing lens of the homogenizer 400 may include multiple lenses. The homogenizer 400 may homogenize the third laser beam LB3 in a long axis direction or a short axis direction to emit the fourth laser beam LB4. The laser device LD may irradiate the fourth laser beam LB4 onto the stage ST.

Figure 4:
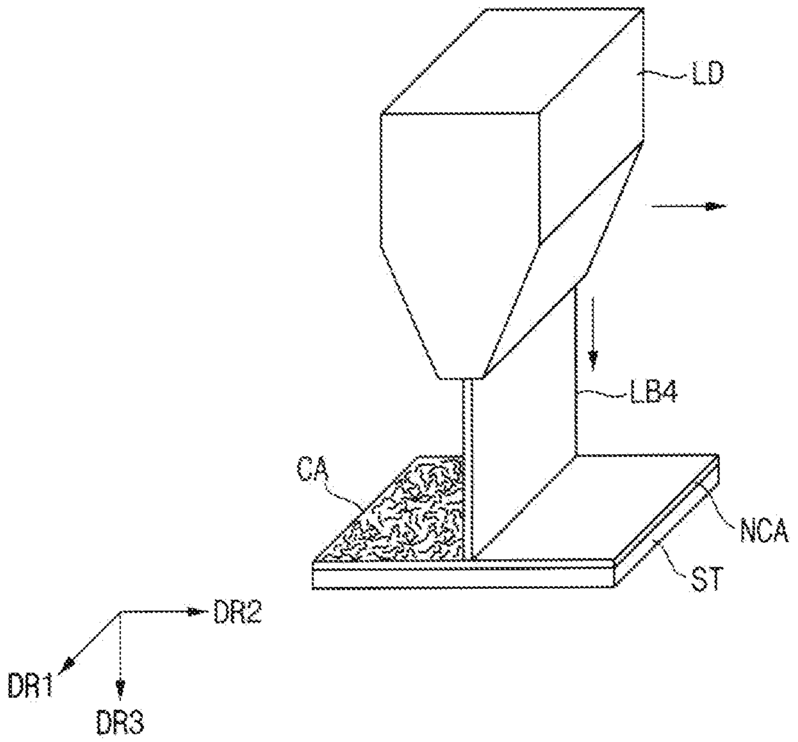
FIG. 4 is a schematic perspective view illustrating a laser device according to an embodiment of the disclosure.

FIG. 4 is a schematic perspective view illustrating a laser device according to an embodiment of the disclosure.

Referring to FIGS. 2 and 4, an amorphous silicon thin film NCA may be disposed on the stage ST. The amorphous silicon thin film NCA may not be disposed alone, but may be disposed on the stage ST together with a separate configuration. For example, the amorphous silicon thin film NCA may be disposed on the stage ST while disposed on the substrate SUB. For example, the substrate SUB may be disposed between the amorphous silicon thin film NCA and the stage ST.

The laser device LD may irradiate the fourth laser beam LB4 onto the amorphous silicon thin film NCA. For example, the laser device LD may radiate the fourth laser beam LB4 while moving in the second direction DR2. As another example, the stage ST may move in a direction opposite to the second direction DR2, and the laser device LD, which may be fixed, may irradiate the fourth laser beam LB4 on the moving stage ST.

The amorphous silicon thin film NCA may be crystallized into a polycrystalline silicon thin film CA by the fourth laser beam LB4. For example, the polycrystalline silicon thin film CA may correspond to the active layers ACT1, ACT2, and ACT3 of FIG. 2. For effective crystallization of the amorphous silicon thin film NCA, a homogeneous fourth laser beam LB4 can be irradiated.

The fourth laser beam LB4 may be emitted in a form of a line extending in a direction. In some embodiments, the fourth laser beam LB4 may be emitted in a third direction DR3 perpendicular to the second direction DR2. A line shape of the fourth laser beam LB4 may extend in a first direction DR1 perpendicular to a third direction DR3 and a second direction DR2 that are emitting directions.

FIGS. 5 to 21 are schematic views illustrating a homogenizer included in the laser device of FIG. 3.

Figure 5:
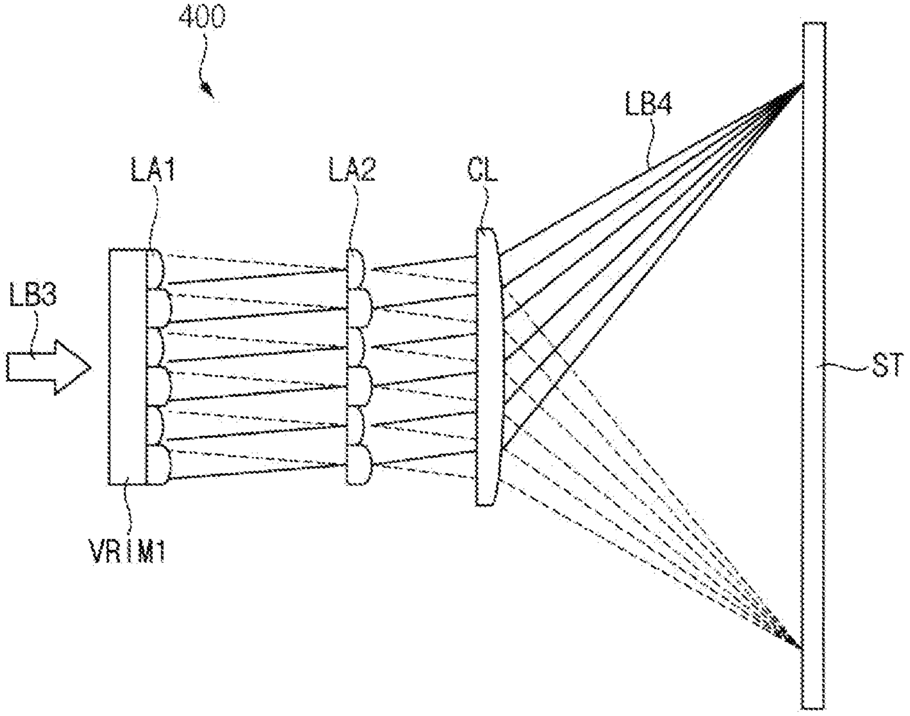
FIGS. 5 to 21 are schematic views illustrating a homogenizer included in the laser device of FIG. 3.

Referring to FIG. 5, the third laser beam LB3 may be incident to the homogenizer 400. The third laser beam LB3 may be converted into the fourth laser beam LB4 to be emitted on the stage ST. The homogenizer 400 may include a first lens array LA1, a second lens array LA2, a condenser lens CL, and a first refractive index adjusting member VRIM1. Each of the first lens array LA1 and the second lens array LA2 may be a homogenizer lens for the short axis of the third laser beam LB3. As another example, each of the first lens array LA1 and the second lens array LA2 may be a homogenizer lens with respect to the long axis of the third laser beam LB3. As another example, one of the first lens array LA1 and the second lens array LA2 may be a homogenizer lens for the short axis of the third laser beam LB3, and another thereof may be a homogenizer lens for the long axis of the third laser beam LB3.

The first lens array LA1 may include multiple lenses (e.g., first lenses). The lenses of the first lens array LA1 may be arranged in a direction. A radius of curvature of some lenses of the lenses of the first lens array LA1 may be different from a radius of curvature of some other lenses of the lenses of the first lens array LA1. The third laser beam LB3 passing through the first lens array LA1 may be refracted to travel to the second lens array LA2. In case that the radius of curvature of the some lenses of the first lens array LA1 is different from the radius of curvature of the some other lenses of the first lens array LA1, a focal length of the some other lenses may be different from a focal length of the some lenses by about −30% to about +30%. Thus, the homogeneity of the fourth laser beam LB4 passing through the homogenizer 400 may be improved, and the homogeneous fourth laser beam LB4 may exit the homogenizer 400.

The second lens array LA2 may include multiple lenses (e.g., second lenses). The lenses of the second lens array LA2 may be arranged in a direction (e.g., first direction). A radius of curvature of some lenses of the lenses of the second lens array LA2 may be different from a radius of curvature of some other lenses of the lenses of the second lens array LA2. In case that the radius of curvature of the some lenses of the second lens array LA2 is different from the radius of curvature of the some other lenses of the second lens array LA2, a focal length of the some other lenses may be different from a focal length of the some lenses by about −30% to about +30%. Thus, the homogeneity of the fourth laser beam LB4 passing through the homogenizer 400 may be improved, and the homogeneous fourth laser beam LB4 may exit the homogenizer 400. The third laser beam LB3 passing through the second lens array LA2 may travel to the condenser lens CL. For example, the condenser lens CL may be disposed on the first lens array LA1 in a direction (e.g., second direction) intersecting the direction (e.g., first direction). Thereafter, the fourth laser beam LB4 refracted by the condenser lens CL may be irradiated onto the stage ST.

In FIG. 5, lenses arranged in odd-numbered rows and lenses arranged in even-numbered rows may have different radii of curvature from each other, but this is illustrative and may not be limited thereto. For example, the lenses of the first lens array LA1 may have different radii of curvature from each other, and the second lens array LA2 may have different radii of curvature from each other. Thus, the lenses having different radii of curvature may be used, and each lens may have different focal lengths.

The first refractive index adjusting member VRIM1 may be disposed on a side of the first lens array LA1. For example, the first refractive index adjusting member VRIM1 may be disposed on the first lens array in a direction (e.g., third direction) opposite to the direction (e.g., second direction). A refractive index of the first refractive index adjusting member VRIM1 may be different (or be changed) depending on a position thereof. For example, the refractive index of the first refractive index adjusting member VRIM1 may change linearly from a bottom portion to a top portion thereof. The refractive index of the first refractive index adjusting member VRIM1 may be changed while being symmetric to each other at the bottom portion and the top portion thereof. The refractive index of the first refractive index adjusting member VRIM1 may change non-linearly from the bottom portion to the top portion. As another example, the refractive index of the first refractive index adjusting member VRIM1 may be changed in a radial shape. However, the disclosure is not limited thereto, and the refractive index of the first refractive index adjusting member VRIM1 may be different according to each position thereof. In another example, the refractive index according to the position of the first refractive index adjusting member VRIM1 may have a sine wave, a square wave, a triangle wave, and a sawtooth wave. In another example, the refractive index of the first refractive index adjusting member VRIM1 may be high or low in each corner portion and low or high in the central portion. As another example, the refractive index of the first refractive index adjusting member VRIM1 may be higher or lower at a corner (e.g., first corner of first refractive index adjusting member VRIM1), and may be lower or higher toward a corner (e.g., second corner of first refractive index adjusting member VRIM1) opposite to the corner (e.g., first corner of first refractive index adjusting member VRIM1). As another example, the refractive index of the first refractive index adjusting member VRIM1 having a three-dimensional structure may be different according to a width direction, a thickness direction, and a height direction. For example, the refractive index of the first refractive index adjusting member VRIM1 may be changed in the directions (e.g., the width direction, thickness direction, and height direction) to have a three-dimensional structure.

The first refractive index adjusting member VRIM1 may improve the homogeneity of the third laser beam LB3 incident to the first lens array LA1, and the homogeneous third laser beam LB3 may exit the first refractive index adjusting member VRIM1. Thus, the homogeneity of the fourth laser beam LB4 passing through the homogenizer 400 may be improved, and the homogeneous fourth laser beam LB4 may exit the homogenizer 400. The fourth laser beam LB4 passing through the homogenizer 400 may be irradiated onto the stage ST.

Figure 6:
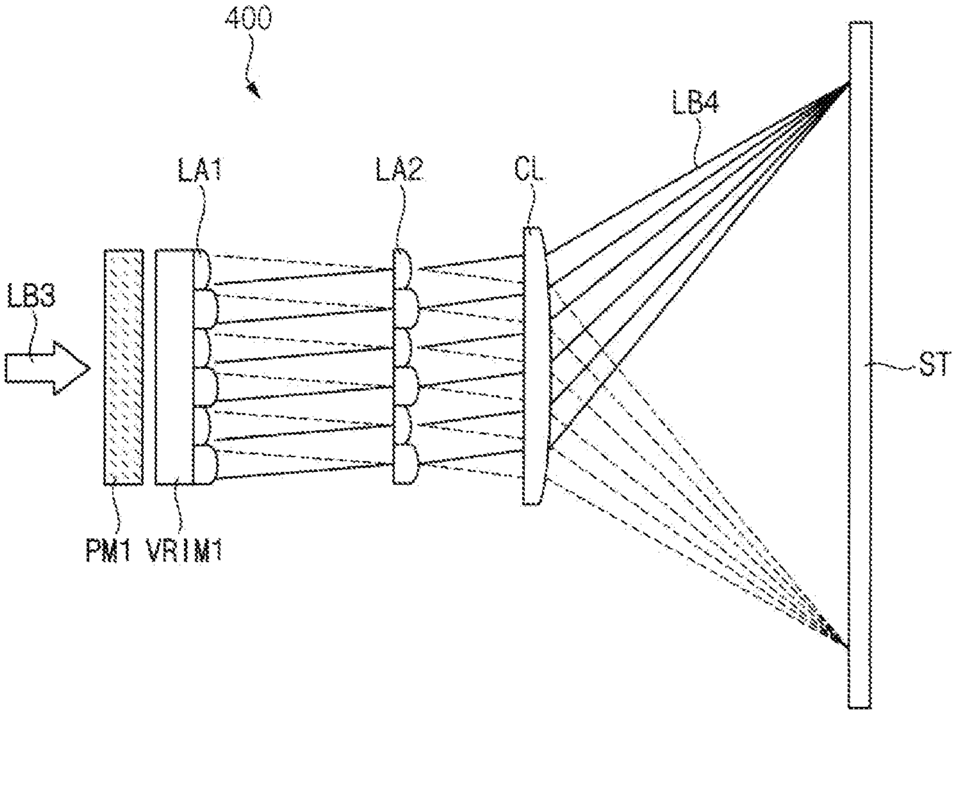

A homogenizer of FIG. 6 may be different from the homogenizer of FIG. 5 at least in that a first polarizing member PM1 is added. Accordingly, a description of the overlapping configuration will be omitted.

Referring to FIG. 6, the first polarizing member PM1 may be disposed on a side of the first refractive index adjusting member VRIM1. The first polarizing member PM1 may be spaced apart from a first lens array LA1 by the first refractive index adjusting member VRIM1. However, unlike the drawings, the first polarizing member PM1 may be disposed between the first refractive index adjusting member VRIM1 and the first lens array LA1. The first polarizing member PM1 may selectively polarize a third laser beam LB3. Accordingly, the polarization characteristic of the third laser beam LB3 may be improved.

The first polarizing member PM1 may be disposed by a surface polarization coating. The first polarizing member PM1 may be disposed in a form of a polarizing film. As another example, the first polarizing member PM1 may be disposed in a form of a polarizer (e.g., a polarizing plate).

In case that the first refractive index adjusting member VRIM1 and the first polarizing member PM1 are disposed together with the first lens array LA1, a homogeneity of the fourth laser beam LB4 may be further improved compared to a case, in which only the first refractive index adjusting member VRIM1 is disposed together with the first lens array LA1. For example, the homogeneity of the fourth laser beam LB4 having passed through the first refractive index adjusting member VRIM1, the first polarizing member PM1, and the first lens array LA1 may be greater than that of the fourth laser beam LB4 only having passed through the first refractive index adjusting member VRIM1 and the first lens array LA1.

Figure 7:
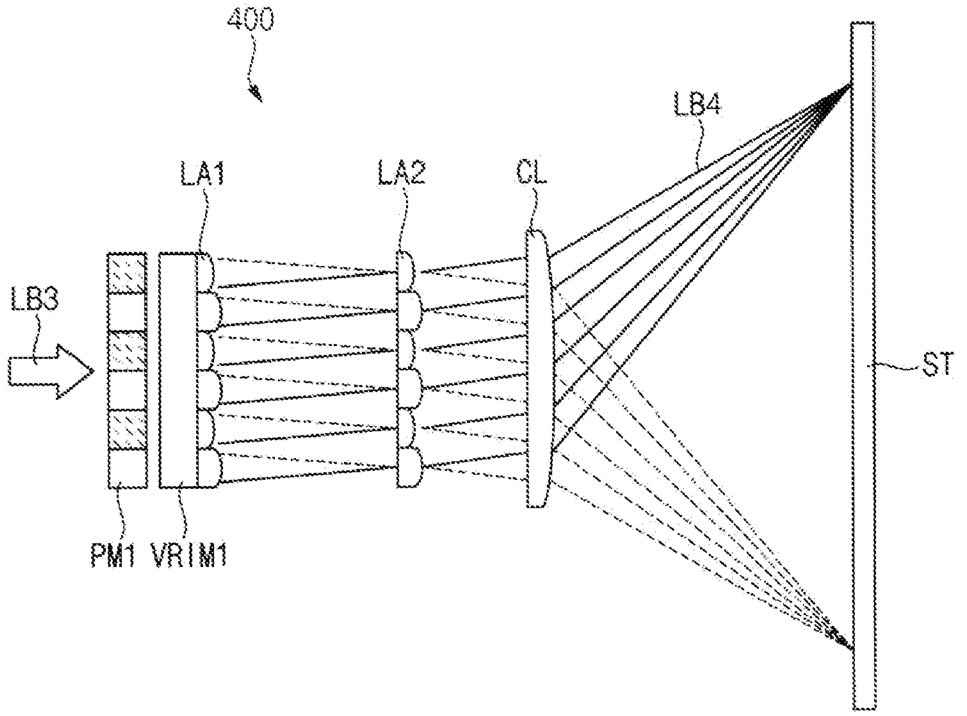

A homogenizer of FIG. 7 may be different from the homogenizer of FIG. 5 at least in that a first polarizing member PM1 is partially disposed on a side of a first lens array LA1. Accordingly, a description of the overlapping configuration will be omitted.

Referring to FIG. 7, the first polarizing member PM1 may polarize only the laser beam incident to some lenses of the first lens array LA1. The first polarizing member PM1 may be disposed on only one side of the partial lenses. Although not illustrated in the drawings, the first polarizing member PM1 may be disposed between the first refractive index adjusting member VRIM1 and the first lens array LA1.

Figure 8:
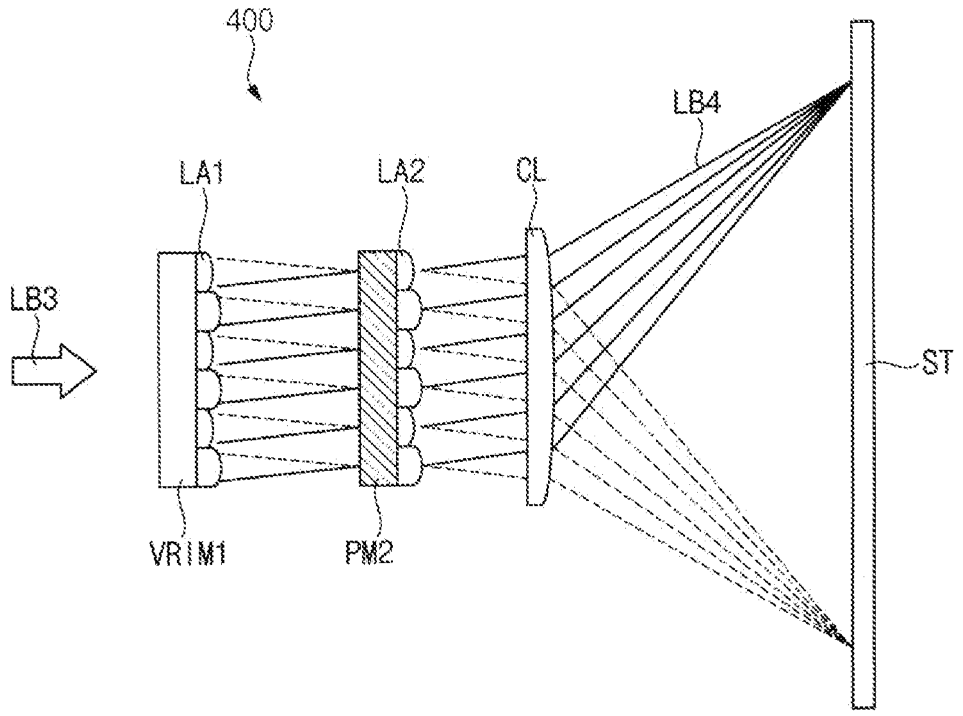

A homogenizer of FIG. 8 may be different from the homogenizer of FIG. 5 at least in that a second polarizing member PM2 is added. Accordingly, detained description of the overlapping configuration will be omitted.

Referring to FIG. 8, the second polarizing member PM2 may be disposed on a side of the second lens array LA2. The second polarizing member PM2 may be coated on the side of the second lens array LA2. The second polarizing member PM2 may be disposed on the side of the second lens array LA2 in the form of a polarizing film. The second polarizing member PM2 may be disposed on the side of the second lens array LA2 in the form of a polarizer (e.g., a polarizing plate).

Figure 9:
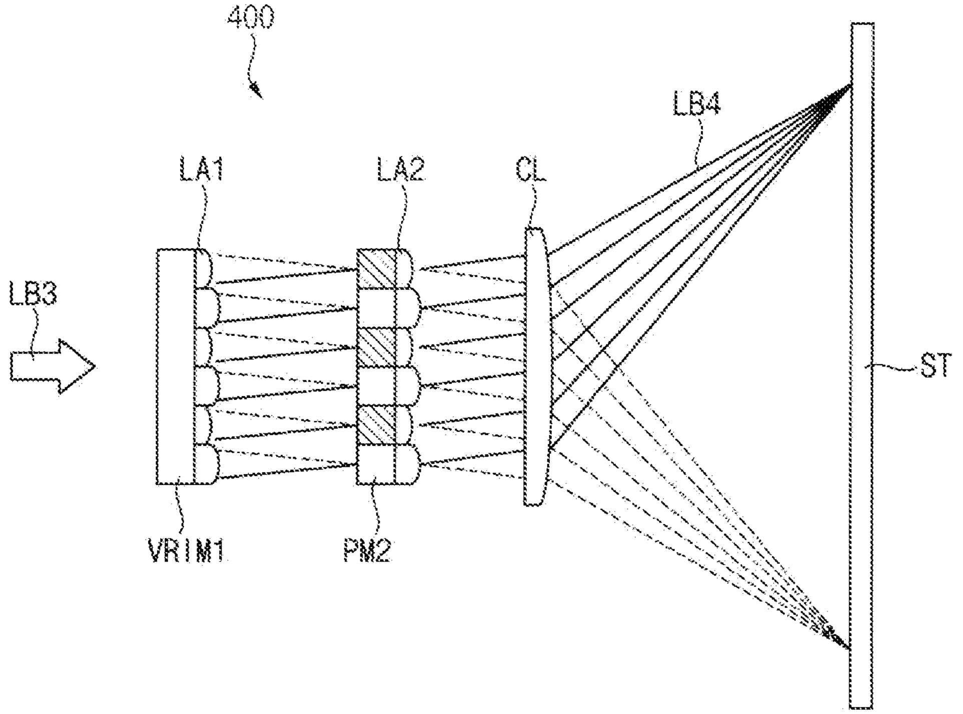

A homogenizer of FIG. 9 may different from the homogenizer of FIG. 5 at least in that a second polarizing member PM2 is partially disposed on a side of a second lens array LA2. Accordingly, a description of the overlapping configuration will be omitted.

Figure 10:
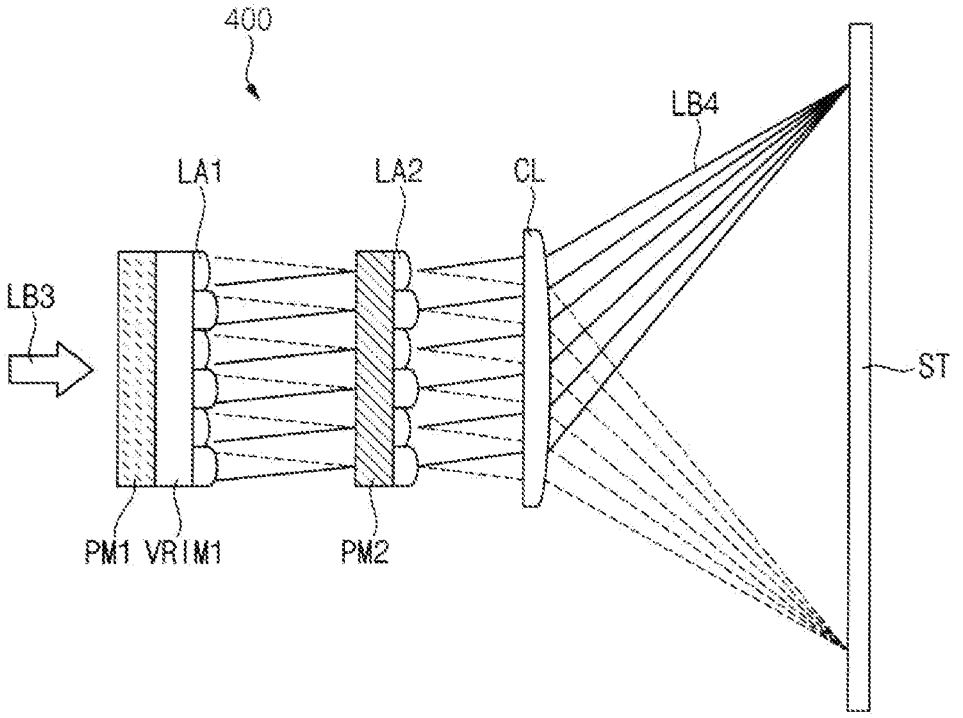

As illustrated in FIG. 10, a first refractive index adjusting member VRIM1, the first polarizing member PM1, and the second polarizing member PM2 may be disposed together, and a homogeneity of a third laser beam LB3 incident on the homogenizer 400 may be improved. For example, in case that the third laser beam LB3 passes through the first refractive index adjusting member VRIM1, the first polarizing member PM1, and the second polarizing member PM2, the homogeneous third laser beam LB3 may exit the homogenizer 400. Unlike illustrated in FIG. 10, at least one of the first polarizing member PM1 and the second polarizing member PM2 may be disposed on only one side of some lenses of the lenses (e.g., first lens array LA1 or second lens array LA2). Also, unlike the drawings, the first polarizing member PM1 may be disposed between the first refractive index adjusting member VRIM1 and the first lens array LA1.

Figure 11:
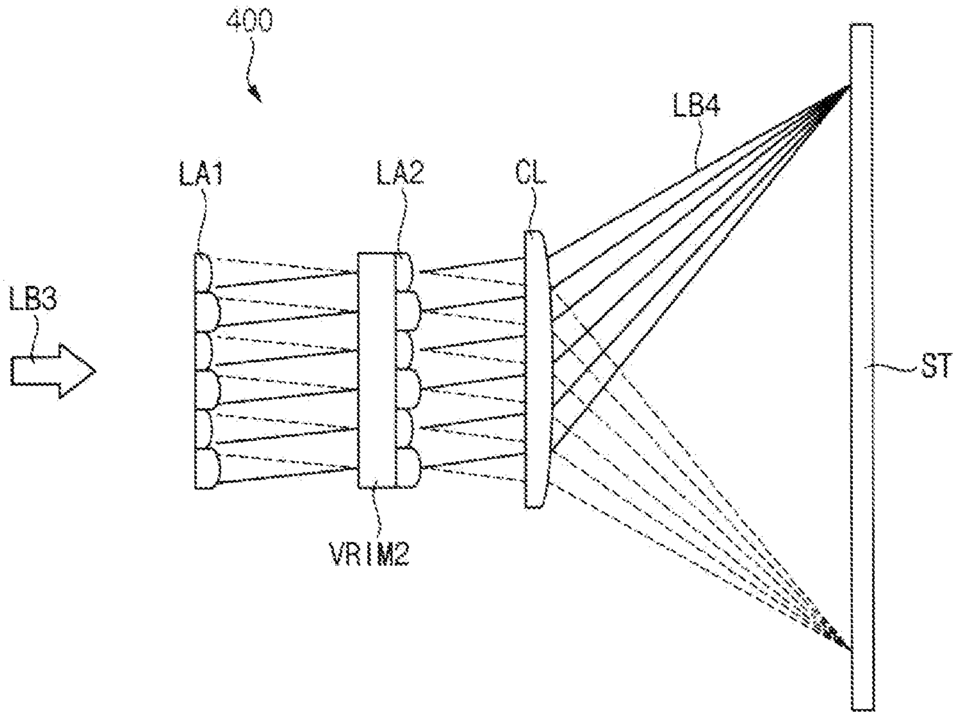

Referring to FIG. 11, a third laser beam LB3 may be incident on a homogenizer 400. The third laser beam LB3 may be converted into a fourth laser beam LB4 to be emitted on a stage ST. The homogenizer 400 may include a first lens array LA1, a second lens array LA2, a condenser lens CL, and a second refractive index adjusting member VRIM2.

The first lens array LA1 may include multiple lenses (e.g., first lenses). The lenses of the first lens array LA1 may be arranged in a direction. A radius of curvature of some lenses of the lenses of the first lens array LA1 may be different from a radius of curvature of some other lenses of the lenses of the first lens array LA1. In case that the radius of curvature of the some lenses of the first lens array LA1 is different from the radius of curvature of the some other lenses of the first lens array LA1, a focal length of the some other lenses may be different from a focal length of the some lenses by about −30% to about +30%. Thus, a homogeneity of the fourth laser beam LB4 passing through the homogenizer 400 may be improved, and the homogeneous fourth laser beam LB4 may exit the homogenizer 400.

The second lens array LA2 may include multiple lenses (e.g., second lenses). The lenses of the second lens array LA2 may be arranged in a direction (e.g., first direction). A radius of curvature of some lenses of the lenses of the second lens array LA2 may be different from a radius of curvature of some other lenses of the lenses of the second lens array LA2. In case that the radius of curvature of the some lenses of the second lens array LA2 is different from the radius of curvature of the some other lenses of the second lens array LA2, a focal length of the some other lenses may be different from a focal length of the some lenses by about −30% to about +30%. Thus, the homogeneity of the fourth laser beam LB4 passing through the homogenizer 400 may be improved, and the homogeneous fourth laser beam LB4 may exit the homogenizer 400.

In FIG. 11, lenses arranged in odd-numbered rows and lenses arranged in even-numbered rows may have different radii of curvature from each other, but this is illustrative and may not be limited thereto. For example, the lenses of the first lens array LA1 may have different radii of curvature from each other, and the second lens array LA2 may have different radii of curvature from each other. Thus, the lenses having the different radii of curvature may be used, and each lens may have different focal lengths.

A second refractive index adjusting member VRIM2 may be disposed on a side of the second lens array LA2. A refractive index of the first refractive index adjusting member VRIM1 may be different (or changed) depending on a position thereof. For example, the refractive index of the second refractive index adjusting member VRIM2 may change linearly from a bottom portion to a top portion thereof. The refractive index of the second refractive index adjusting member VRIM2 may be changed in a symmetric from the bottom portion to the top portion thereof. The refractive index of the second refractive index adjusting member VRIM2 may change non-linearly from the bottom portion to the top portion. In other embodiments, the refractive index of the second refractive index adjusting member VRIM2 may be changed in a radial shape. However, the disclosure is not limited thereto, and the refractive index of the second refractive index adjusting member VRIM2 may be different according to each position thereof. In another example, the refractive index according to the position of the second refractive index adjusting member VRIM2 may have a sine wave, a square wave, a triangle wave, a sawtooth wave, or the like. In another example, the refractive index of the second refractive index adjusting member VRIM2 may be high or low in each corner portion and low or high in the central portion. As another example, the refractive index of the second refractive index adjusting member VRIM2 may be higher or lower at a corner (e.g., first corner of second refractive index adjusting member VRIM2), and may be lower or higher at a corner (e.g., second corner of second refractive index adjusting member VRIM2) opposite to the corner (e.g., first corner of second refractive index adjusting member VRIM2). As another example, the refractive index of the second refractive index adjusting member VRIM2 having a three-dimensional structure may be different according to a width direction, a thickness direction, and a height direction. For example, the refractive index of the second refractive index adjusting member VRIM2 may be changed in the directions (e.g., width direction, thickness direction, and height direction) to have the three-dimensional structure.

The second refractive index adjusting member VRIM2 may improve a homogeneity of the third laser beam LB3 incident to the second lens array LA2. For example, the homogeneous third laser beam LB3 may exit the second refractive index adjusting member VRIM2. Thus, a homogeneity of the fourth laser beam LB4 passing through the homogenizer 400 may be improved, and the homogeneous fourth laser beam LB4 may exit the homogenizer 400. The fourth laser beam LB4 passing through the homogenizer 400 may be irradiated onto the stage ST.

Figure 12:
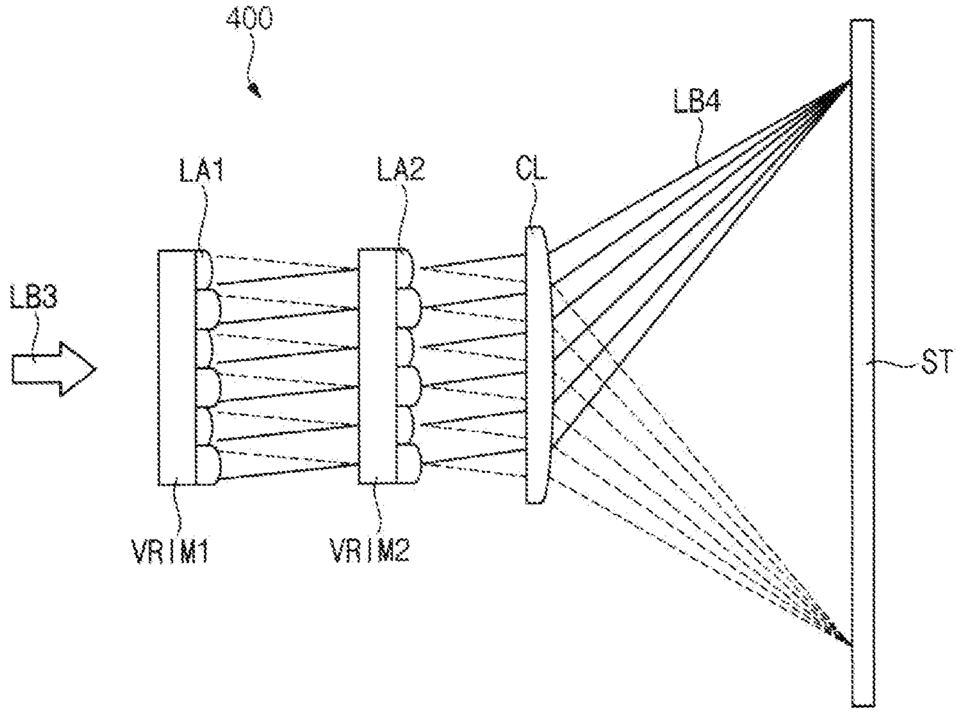

A homogenizer of FIG. 12 may be different from the homogenizer of FIG. 11 at least in that a first refractive index adjusting member VRIM1 is additionally disposed. Accordingly, a description of the overlapping configuration will be omitted.

Although not illustrated in FIGS. 11 and 12, polarizing members PM1 and PM2 described with reference to FIGS. 6 to 10 may be equally disposed in FIGS. 11 and 12.

Figure 13:
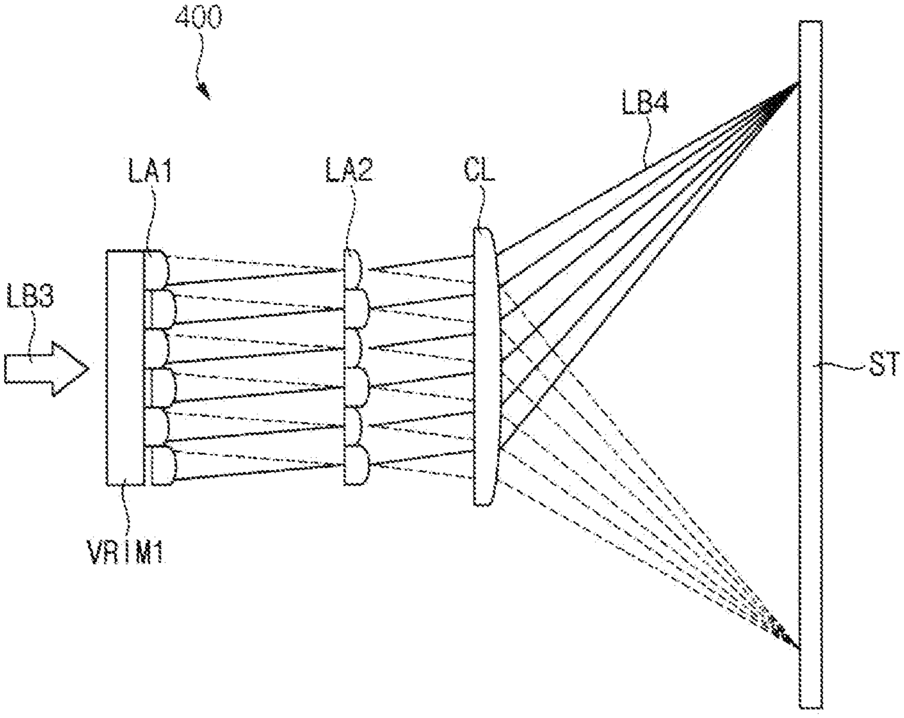

Referring to FIG. 13, lenses of a first lens array LA1 may have a same radius of curvature. Some lenses of the lenses (e.g., first lenses) of the first lens array LA1 may be disposed on an imaginary line extending in a direction (e.g., first direction). Some other lenses of the lenses (e.g., first lenses) of the first lens array LA1 may be spaced apart from each other in a direction (e.g., second direction) perpendicular to the direction (e.g., first direction) compared to the some lenses. In case that the some lenses of the first lens array LA1 are disposed at different positions from the some other lenses of the first lens array LA1, a position where a focus of the some other lenses of the first lens array LA1 are formed may different from a position where a focus of the some lenses of the first lens array LA1 are formed by about −30% to about +30%.

The first refractive index adjusting member VRIM1 may be disposed on a side of the first lens array LA1. A refractive index of the first refractive index adjusting member VRIM1 may be different (or changed) depending on a position thereof. For example, a refractive index of the first refractive index adjusting member VRIM1 may change linearly from a bottom portion to a top portion thereof. The refractive index of the first refractive index adjusting member VRIM1 may be changed in a symmetric form from the bottom portion to the top portion thereof. The refractive index of the first refractive index adjusting member VRIM1 may change non-linearly from the bottom portion to the top portion. In other embodiments, the refractive index of the first refractive index adjusting member VRIM1 may change in a radial shape.

The first refractive index adjusting member VRIM1 may improve a homogeneity of the third laser beam LB3 incident to the first lens array LA1, and the homogeneous third laser beam LB3 may exit the first refractive index adjusting member VRIM1. Thus, a homogeneity of the fourth laser beam LB4 passing through the homogenizer 400 may be improved, and the homogeneous fourth laser beam LB4 may exit the homogenizer 400. The fourth laser beam LB4 passing through the homogenizer 400 may be irradiated onto the stage ST.

Figure 14:
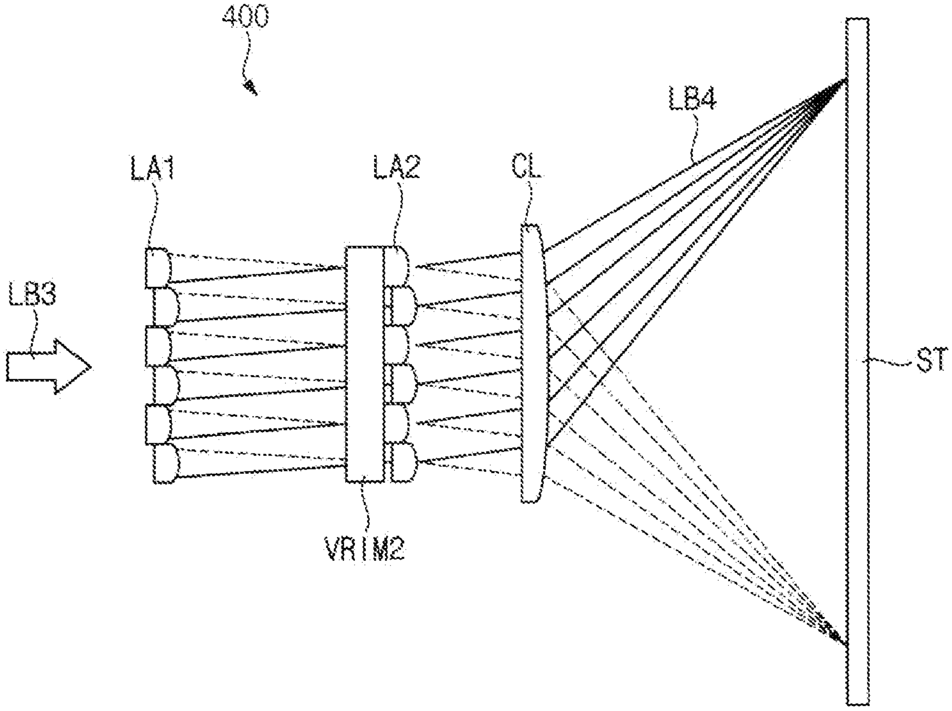

A homogenizer of FIG. 14 is different from the homogenizer of FIG. 13 at least in that a second refractive index adjusting member VRIM2 is disposed and the first refractive index adjusting member VRIM1 is not disposed. Accordingly, a description of the overlapping configuration will be omitted.

Figure 15:
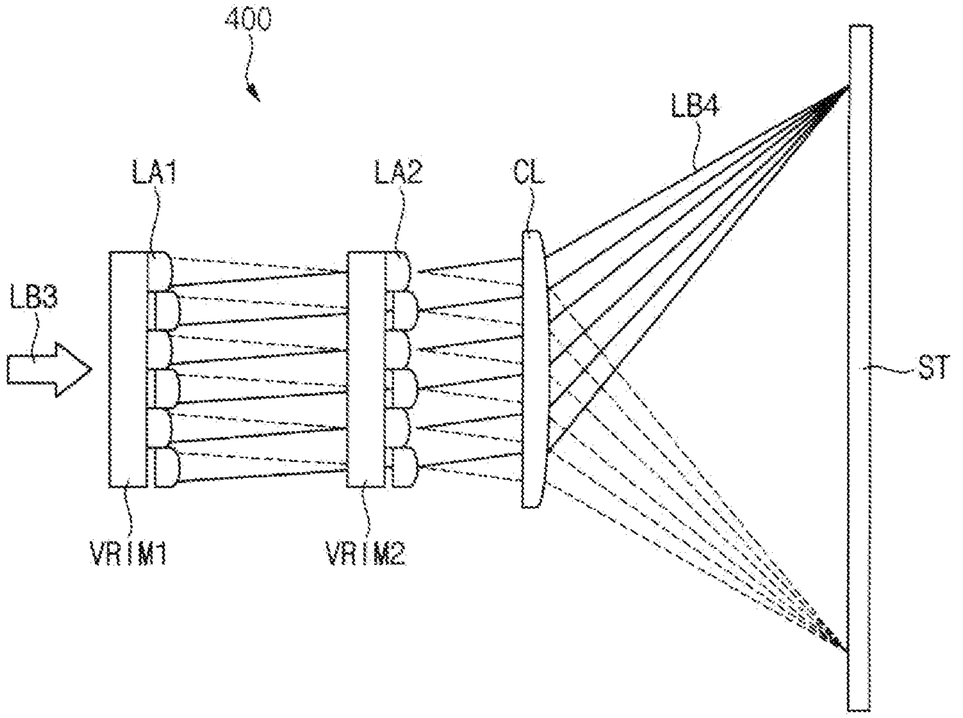

A homogenizer of FIG. 15 may be different from the homogenizer of FIG. 13 at least in that a second refractive index adjusting member VRIM2 is further disposed. Accordingly, a description of the overlapping configuration will be omitted.

Although not illustrated in FIGS. 13 to 15, the polarizing members PM1 and PM2 described with reference to FIGS. 6 to 10 may be equally disposed in FIGS. 13 to 15.

Figure 16:
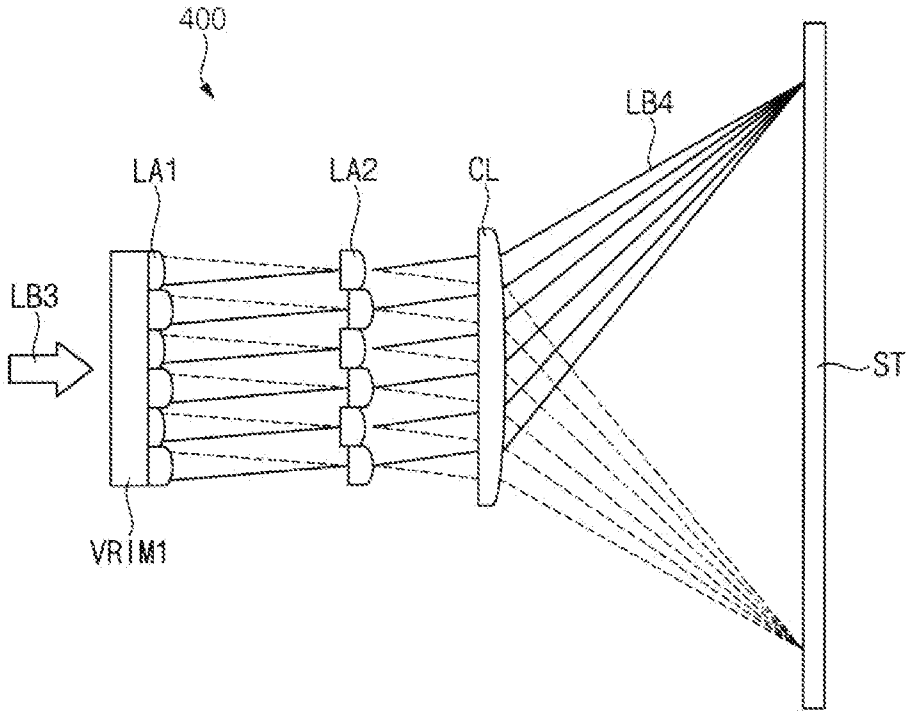
Figure 17:
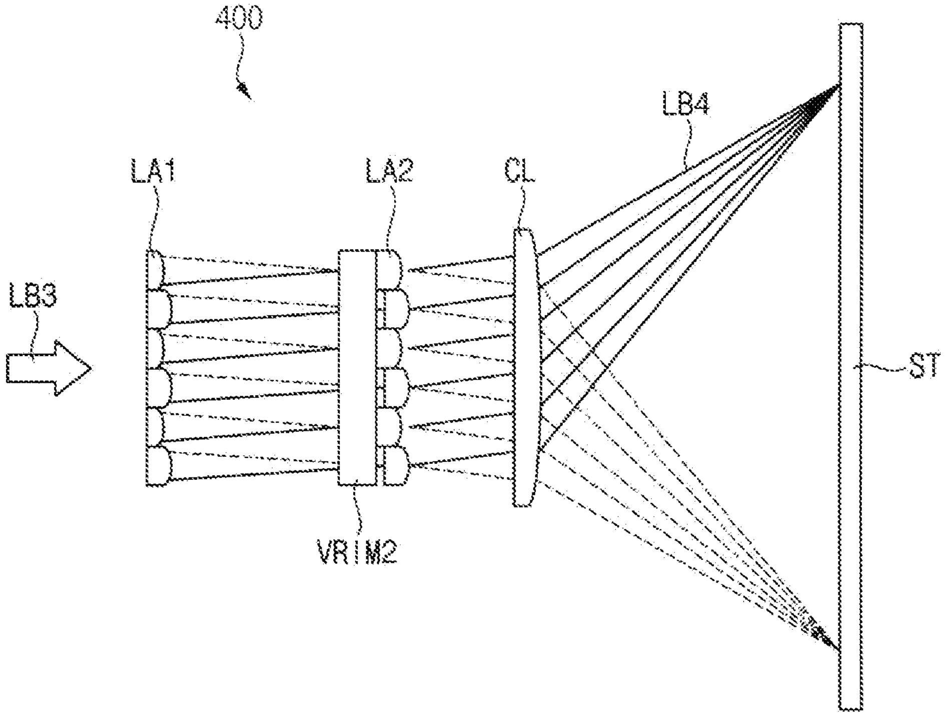
Figure 18:
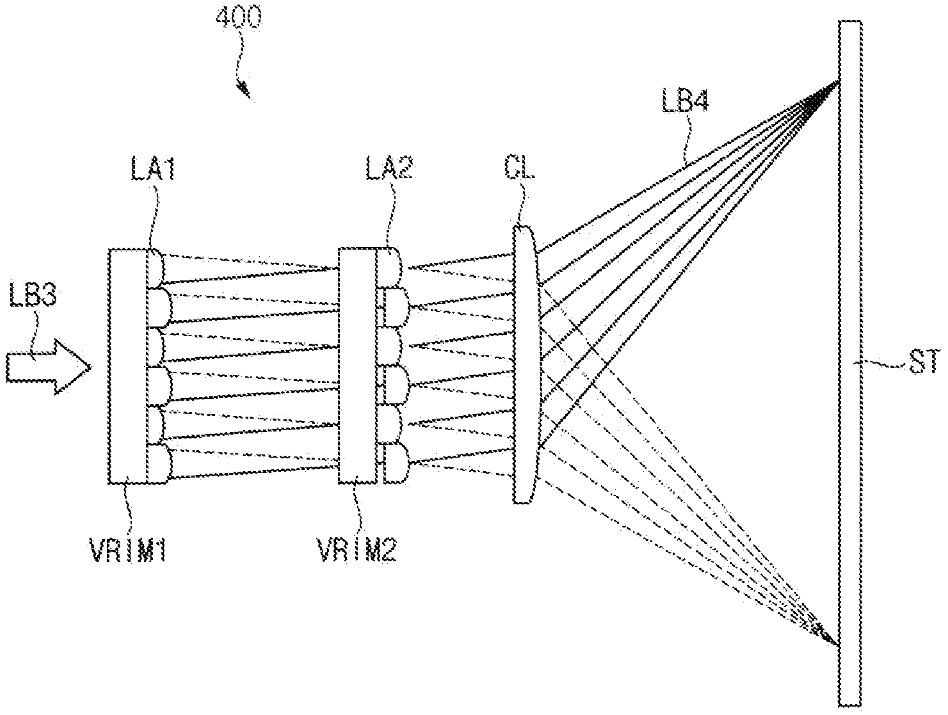

Homogenizers of FIGS. 16 to 18 may be different from the above-described contents at least in that a first lens array LA1 including multiple lenses having different radii of curvature from each other and a second lens array LA2 including multiple lenses disposed at different positions are used. Accordingly, a description of the overlapping configuration will be omitted.

Figure 19:
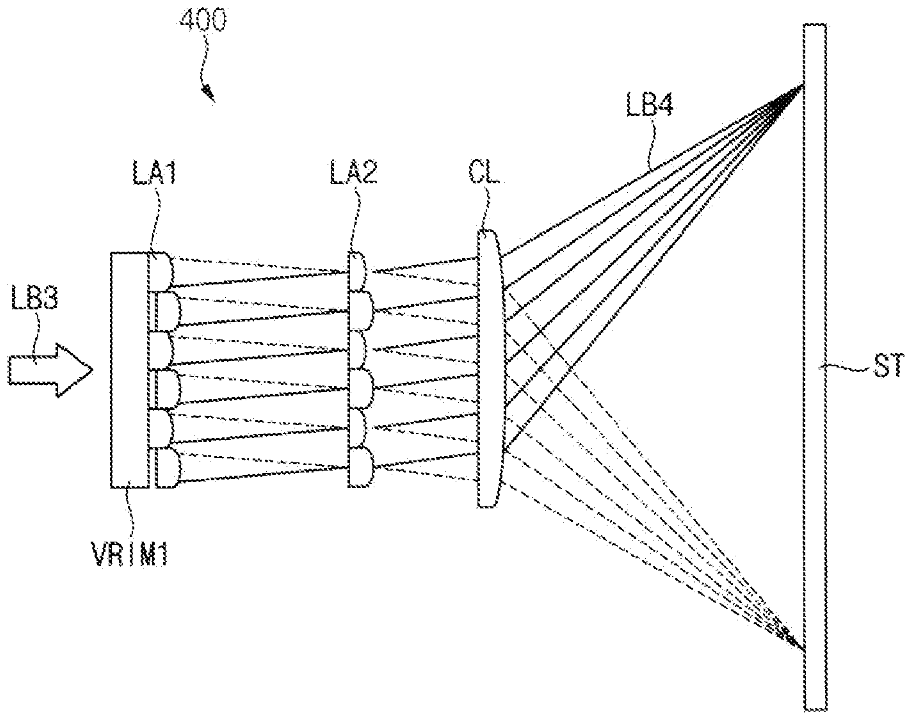
Figure 20:
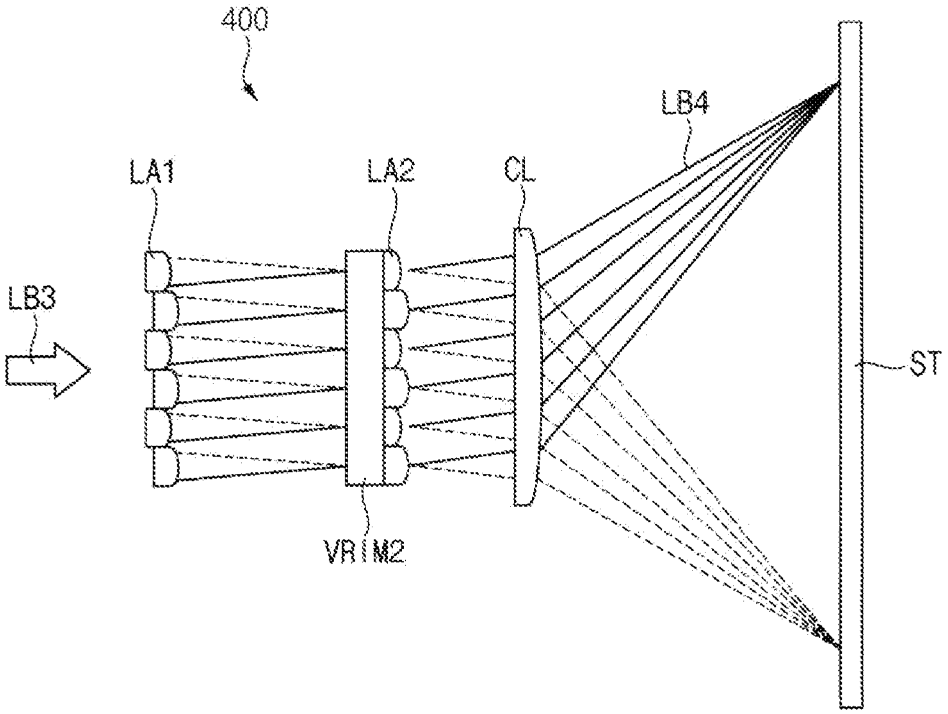
Figure 21:
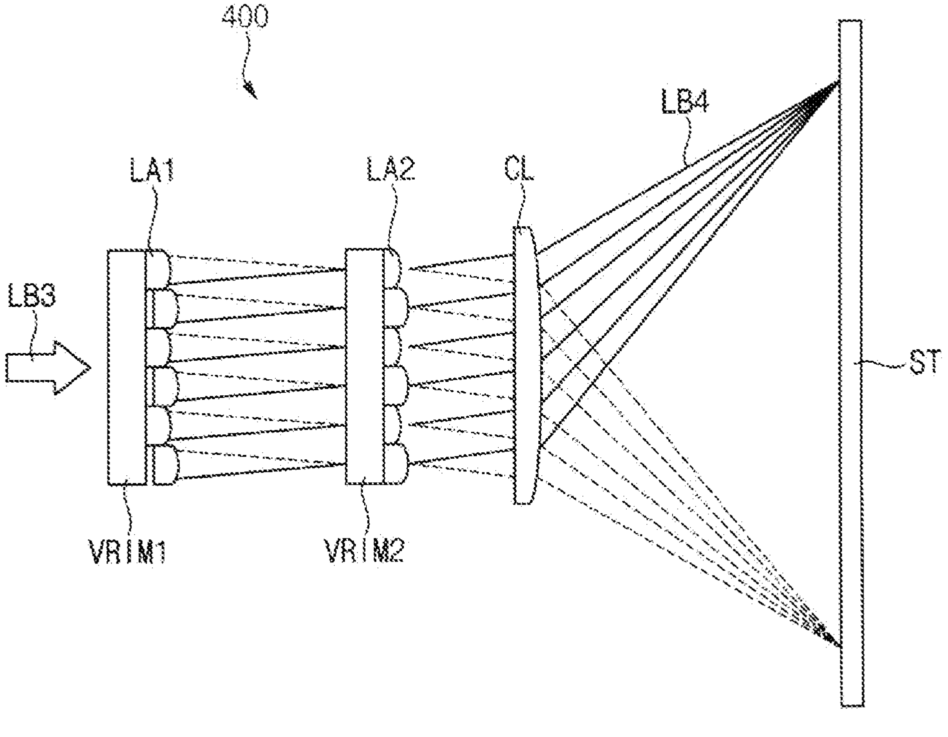

Homogenizers of FIGS. 19 to 21 may be different from the above-described contents at least in that a second lens array LA2 including multiple lenses having different radii of curvature from each other and a first lens array LA1 including multiple lenses disposed at different positions are used. Accordingly, a description of the overlapping configuration will be omitted.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A laser device comprising:

a first lens array including first lenses arranged together with each other in a first direction;

a condenser lens disposed in a second direction from the first lens array, the second direction intersecting the first direction; and a first refractive index adjusting member disposed in a third direction from the first lens array, the third direction being opposite to the second direction, wherein a refractive index of the first refractive index adjusting member changes along the first direction, and wherein the first lens array directly contacts a side of the first refractive index adjusting member.

2. The laser device of claim 1, wherein part of the first lenses have different radii of curvature from an other part of the first lenses, and focal lengths of the other part of the first lenses are about −30% to about +30% compared to focal lengths of the part of the first lenses.

3. The laser device of claim 2, further comprising:

a polarizing member disposed in the third direction from the first lens array.

4. The laser device of claim 1, wherein:

part of the first lenses are disposed at different positions in the second direction from an other part of the first lenses, and a position at which a focus of the other part of the first lenses is formed is about −30% to about +30% compared to a position at which a focus of the part of the first lenses is formed.

5. The laser device of claim 4, further comprising:

a polarizing member disposed in the third direction from the first lens array.

6. The laser device of claim 1, further comprising:

a polarizing member disposed in the third direction from the first lens array.

7. The laser device of claim 6, wherein the polarizing member is disposed between the first lens array and the first refractive index adjusting member.

8. The laser device of claim 6, wherein the first refractive index adjusting member is disposed between the polarizing member and the first lens array.

9. The laser device of claim 6, wherein the polarizing member is disposed only in the third direction from part of the first lenses.

10. The laser device of claim 1, wherein the first refractive index adjusting member extends from a bottom portion to a top portion in the first direction, and the refractive index of the first refractive index adjusting member changes from the bottom portion to the top portion.

11. The laser device of claim 10, wherein the refractive index of the first refractive index adjusting member changes linearly from the bottom portion to the top portion.

12. The laser device of claim 10, wherein the refractive index of the first refractive index adjusting member changes non-linearly from the bottom portion to the top portion.

13. The laser device of claim 10, wherein the refractive index of the first refractive index adjusting member is symmetrical with respect to a center of the first refractive index adjusting member.

14. The laser device of claim 1, further comprising:

a second lens array disposed between the first lens array and the condenser lens and including second lenses.

15. The laser device of claim 14, further comprising:

a second refractive index adjusting member disposed in the third direction from the second lens array.

16. The laser device of claim 15, further comprising:

a polarizing member disposed in the third direction from the second lens array.

17. The laser device of claim 16, wherein the polarizing member is disposed between the second lens array and the second refractive index adjusting member.

18. The laser device of claim 16, wherein the second refractive index adjusting member is disposed between the polarizing member and the second lens array.

19. The laser device of claim 16, wherein the polarizing member is disposed only in the third direction from part of the second lenses.

* * * * *